July 5, 1955   C. C. S. LE CLAIR   2,712,402
NOZZLES FOR GREASE GUNS AND THE LIKE
Filed Aug. 11, 1949   2 Sheets-Sheet 1
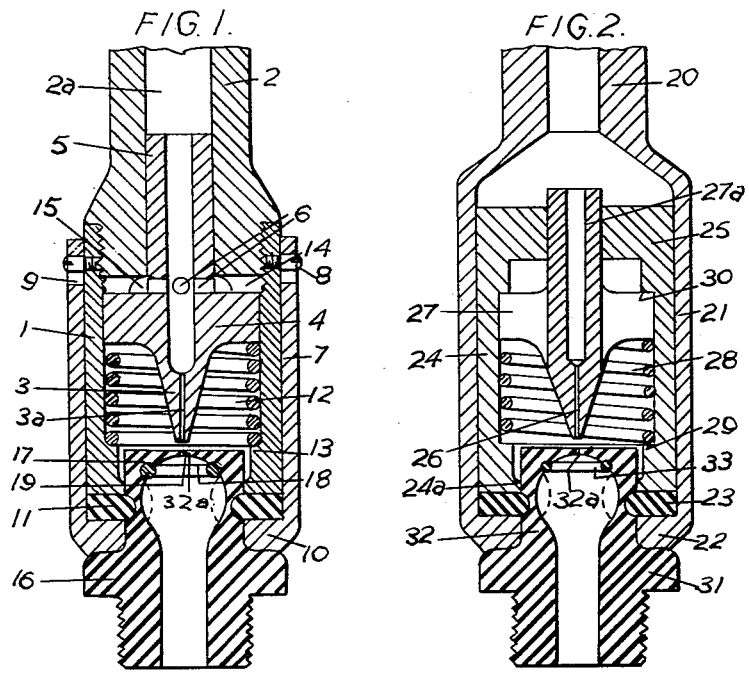
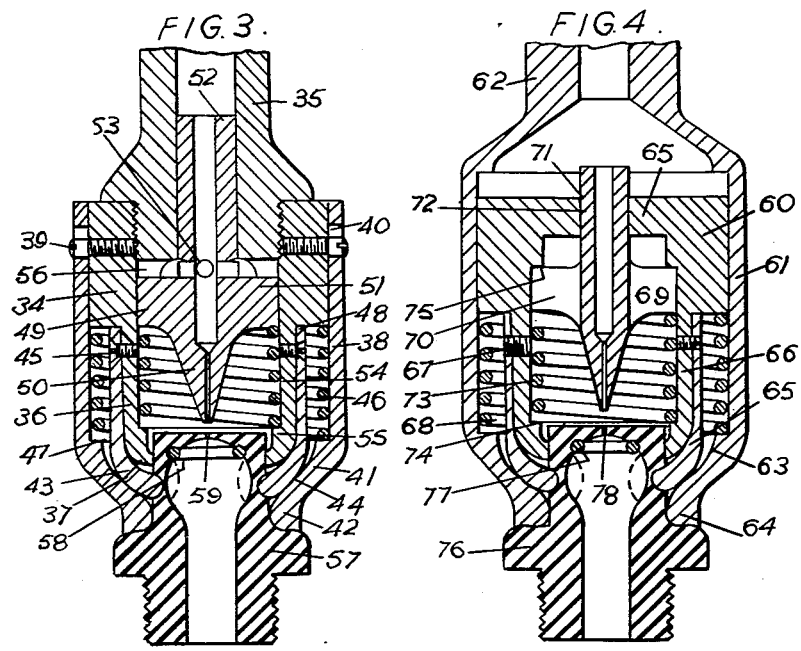
Inventor:
Camille Clare Sprankling Le Clair
By Hinkle, Horton, Ahlberg, Hangmann & Kuyper
Attorneys.

July 5, 1955
C. C. S. LE CLAIR
2,712,402
NOZZLES FOR GREASE GUNS AND THE LIKE
Filed Aug. 11, 1949
2 Sheets-Sheet 2
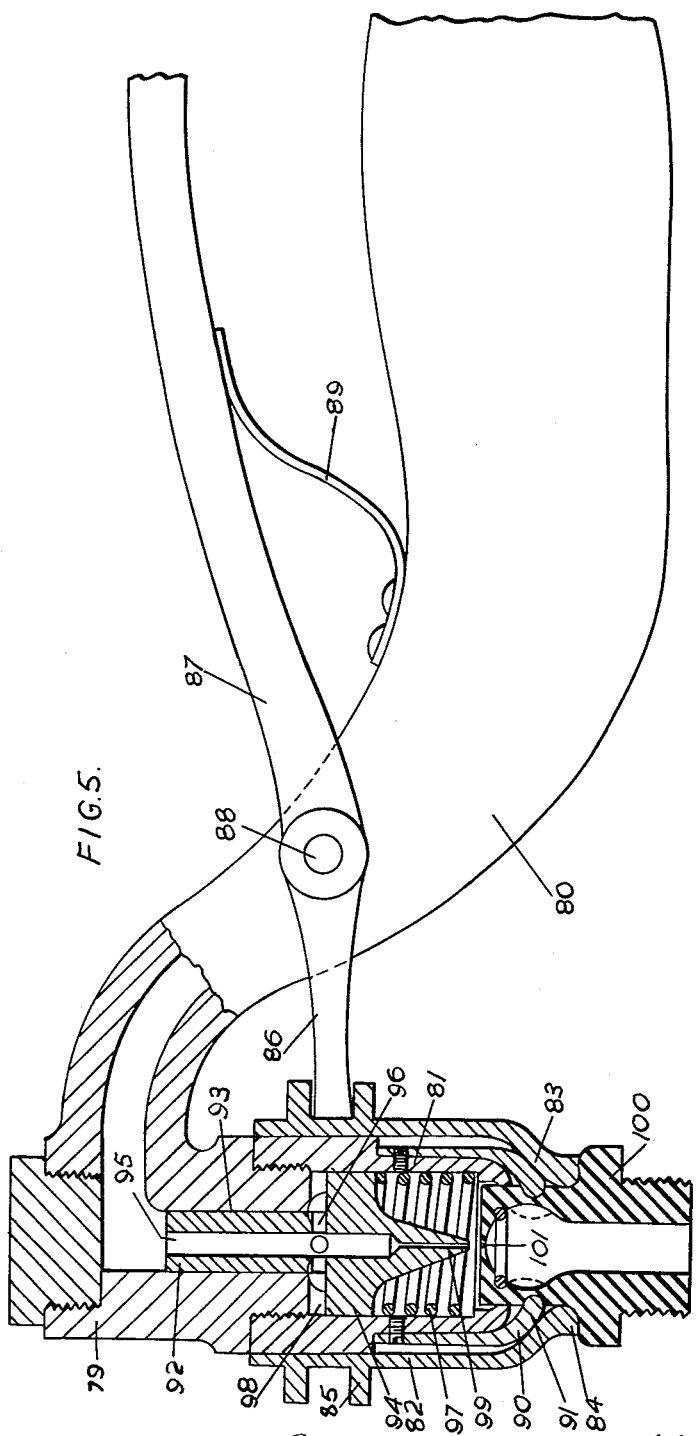
Inventor:
Camille Clare Sprankling Le Clair
By Hinkle, Horton, Ullberg, Hauptmann & Hupper
Attorneys.

United States Patent Office 2,712,402
Patented July 5, 1955

2,712,402

NOZZLES FOR GREASE GUNS AND THE LIKE

Camille Clare Sprankling Le Clair, Acton, London, England, assignor to Tecalemit Limited, Brentford, Great Britain, a British company Application August 11, 1949, Serial No. 109,776

Claims priority, application Great Britain September 16, 1948

5 Claims. (Cl. 222—121)

This invention relates to nozzles of grease guns or equivalent devices (hereinafter called "grease guns") for use with resilient, lubricant-impervious closure members or teats of the type described and claimed in my co-pending patent application No. 39,729, now Patent No. 2,594,040.

Such a resilient, lubricant-impervious closure member or teat is constructed so as to act either as a closure for the inlet end of a lubricant supply passage formed in a hollow rigid nipple having a body part including a projecting teat-receiving collar or sleeve, or which, alternatively, is constructed so as to form a complete nipple which is adapted to act as a closure for the inlet end of a lubricant supply passage formed in a bearing or other member (hereinafter called "bearing") upon which the closure member or teat is mounted. The closure member or teat is either in the form of a hollow cap adapted to be mounted upon the rigid nipple collar or sleeve, or itself constitutes a nipple comprising a body part, a shank, by means of which the closure member or teat may be fixed in the lubricant supply passage in the bearing and a nozzle-engaging head. The closure member or teat in either case is hollow and formed with a lubricant supply passage the inlet end of which is in the form of a normally closed hole of no measurable diameter or one or more slits of no measurable width.

Rigid means adapted to act as a fulcrum may also be provided in such a closure member or teat whereby when lateral or radial pressure is applied by the nozzle to the material at the side of the closure member or teat below the said means and the material is thereby forced inwards, the material above and radially inwards of the said means is forced outwards by leverage effects, and the normally closed inlet end of the lubricant passage in the closure member or teat is thereby opened.

Thus, in one constructional form, the closure member or teat is in the form of a hollow cap adapted to be mounted upon the teat-receiving sleeve of a hollow rigid nipple body part, the cap being formed with an internal recess which is of such a size relative to the sleeve that a closed annular space is left between the side of the latter and the wall of the cap. The recess is so shaped that when the cap is fitted upon the sleeve the upper end of the latter engages in a groove in the cap and thus acts as a fulcrum about which a leverage effect can take place so that when lateral or radial pressure is applied to the side of the cap opposite to the recess it will cause the material of the cap surrounding the recess to be forced inwardly and thereby the material of the upper end of the cap beyond the upper end of the sleeve to be spread, thus pulling open the normally closed inlet end of the lubricant supply passage in the closure member or teat.

The rigid nipple body part may be provided with external locating means, such as a laterally-projecting flange, which may not only serve as a stop against which the nipple is screwed but also, as described hereinafter, acts to limit the extent to which the nozzle of the grease gun can be engaged over the resilient closure member or teat.

In an alternative construction, the closure member or teat itself forms a complete nipple adapted to act as a closure member for the lubricant supply passage in the bearing and which comprises a body part, a shank by which it may be fixed in the lubricant supply passage and a nozzle-engaging head, which is formed with an internal recess terminating short of the upper surface of the head and thus provides a comparatively thin wall through which is formed a normally-closed lubricant supply passage in the form of a hole of no measurable diameter or one or more slits of no measurable width. A nipple of this construction preferably comprises a rigid reinforcing ring fitted in the said recess and acting as a fulcrum around which the material of the head moves so that the normally closed inlet end of the lubricant supply passage in the head is opened by a leverage effect when lateral pressure is applied to the side of the head.

Locating means, corresponding to those provided in the rigid nipple construction, and comprising a laterally projecting flange, may also be provided in this construction, for the same purpose, viz., to locate the nipple on the bearing and to limit the amount of engagement of the nozzle over the head.

According to the present invention a grease gun nozzle for use with resilient, lubricant impervious closure members or teats of the kind referred to is characterized by the feature that it comprises means which is operable manually or, alternatively, under the pressure of grease fed into the nozzle and is adapted to apply pressure radially or laterally to the outer surface of the side of the said cap or the said nozzle-engaging head of the nipple so as to cause the cap or the head to be distorted or deflected in such a manner that the inlet end of the said lubricant supply passage in the cap or the nozzle-engaging head is pulled open, whereupon a hollow movable lubricant injector device actuated by the pressure of grease fed into the nozzle can enter the said lubricant supply passage in the cap or the nozzle-engaging head and allow grease to be fed into the latter and thence to the place of use of the grease.

The means for applying pressure radially or laterally to the outer surface of the side of the cap or the nozzle-engaging head may consist of a ring which is mounted within the nozzle and is made of soft resilient material such as rubber, synthetic rubber or felt and which, under thrust applied to the nozzle manually in the act of fitting the nozzle over the said cap or the nozzle-engaging head, first embraces the cap or head and is then compressed and forced inwards radially or laterally so as to deflect or distort the cap or the head when the engaging movement of the nozzle is prevented by the latter contacting with a stop such as the above mentioned laterally-projecting flange forming part of the nipple.

On the other hand, the nozzle may comprise a slidable member which, under the pressure of the grease fed into the nozzle, acts to force the ring inwardly radially or laterally to distort or deflect the cap or the nozzle engaging head.

As an alternative, the soft resilient ring may be replaced by a number of jaws which are loosely attached to a fixed member forming part of the nozzle and which cooperate with a movable abutment forming part of the nozzle, the arrangement being such that when the nozzle is engaged on the cap or nozzle-engaging head, the jaws fit around the latter, whereafter, by manual thrust applied to the nozzle, they are forced inwardly radially or laterally to distort or deflect the cap or head by cooperation with the movable abutment, the movement of which latter is limited by a fixed stop.

As an alternative to the above arrangement, however, the jaws may be loosely attached to a slidable member which forms part of the nozzle and which, under the pressure of grease fed into the nozzle, is moved in such a direction as to cause the jaws, by cooperation with an abutment, which in this construction is fixed, to move inwards radially or laterally in order to deflect the cap or nozzle engaging head.

In any construction, the injector device comprises a pointed end which, under the action of grease under pressure fed into the nozzle acting upon the device, is forced into the lubricant supply passage formed in the cap or the nozzle-engaging head after the cap or the nozzle-engaging head has been distorted or deflected initially in the manner described above in order to open the normally closed inlet end of the passage.

Further constructional features of the invention will be described hereinafter.

Five constructional forms of the invention are shown, by way of example, on the accompanying drawings, whereon:

Figure 1 is a sectional elevation of a nozzle which comprises a fixed inner sleeve and a slidable outer sleeve between which the soft resilient ring is disposed and is forced inwardly radially or laterally to distort or deflect the cap or the nozzle-engaging head by manual thrust applied to the nozzle;

Figure 2 is a sectional elevation of a nozzle in which the soft resilient ring is disposed between a slidable inner sleeve and a fixed outer sleeve and is forced inwardly radially or laterally to distort or deflect the cap or the nozzle-engaging head by the grease pressure acting upon the inner sleeve;

Figure 3 is a sectional elevation of a nozzle which comprises a fixed inner sleeve, a slidable outer sleeve and jaws which are loosely attached to the inner sleeve and are forced inwards to distort or deflect the cap or the nozzle-engaging head by manual thrust applied to the nozzle;

Figure 4 is a sectional elevation of a nozzle which comprises a fixed outer sleeve, a slidable inner sleeve and jaws which are loosely attached to the inner sleeve and are forced inwards to distort or deflect the cap or the nozzle-engaging head by grease pressure acting upon the inner sleeve; and Figure 5 is a modification of the nozzle shown in Figure 3 in which the slidable outer sleeve is operated by mechanical means.

Although shown in the drawings in association with closure members or teats which themselves form complete nipples, it will be understood that the nozzles are also suitable for use with the cap type of teat associated with a rigid nipple body referred to above.

For the purpose of description it will be assumed hereinafter that the nipples and nozzles are arranged with their common axes vertical.

Referring first to Figure 1:

The nozzle shown in this figure comprises an inner sleeve 1, which is screwed on to the hollow shank 2 of the grease gun, and a hollow grease injector device of the grease gun, comprising a pointed end 3 which is formed with a lubricant supply passage 3a and is integral with a piston part 4, which is slidable in the inner sleeve 1, and a hollow guide shank 5 which is slidable in the bore 2a of the grease gun shank and is formed with a number of lateral ports 6. An outer sleeve 7 is slidably arranged upon the outside of the inner sleeve, its slidable motion thereing being limited by a pin or pins 8 screwed into the inner sleeve and engaging in an elongated slot or slots 9 formed in the outer sleeve. The lower end of the latter is provided with an inwardly-turned flange 10 and between the latter and the lower end of the inner sleeve there is inserted a ring 11 of substantially rectangular section made of soft resilient material such as rubber, synthetic rubber or felt.

A coil spring 12 reacts between a shoulder 13 formed in the inner sleeve 1 and the underside of the piston part 4 of the grease injector device and acts to thrust the latter upwards. The upward motion of the injector device is limited by one or more stops 14 provided on the end of the hollow shank 2 of the grease gun so that the ports 6 are in constant communication with an annular space 15 formed between the lower end of the grease gun shank and the top face of the piston part 4 of the injector device.

When the nozzle is applied to the nipple the soft resilient ring 11 fits over the head 17 of the nipple and the bottom face of the flange 10 on the outer sleeve 7 bears upon the annular locating flange 16 of the nipple. Thereafter, manual pressure applied to the grease gun causes the inner sleeve 1 to move towards the nipple relative to the outer sleeve thereby gripping the soft resilient ring 11 and causing it to be distorted radially inwards thus crushing the side of the head 17 of the nipple below the metal reinforcing ring 18 inwards towards the axis of the nipple as shown in dotted lines. This distortion of the nipple head (by leverage effect) causes its top surface to spread and the inlet end of the said small size lubricant passage 19 to open. When pressure is applied to the grease by the grease gun some of the grease inside the hollow injector device passes through the ports 6 in the hollow guide shank 2 of the injector into the annular space 15 between the end of the grease gun shank and the adjacent face of the piston part 4 of the injector device and the pressure of the grease therein acting upon the piston part, thrusts the injector device downwards against the counteraction of the coil spring 12. The pointed end 3 of the injector device is thus forced into the opened end of the small size lubricant passage in the nipple head and a charge of grease is injected into the nipple and thence to the place of use.

When the grease pressure in the nozzle is released the injector device is thrust upwards by its spring 12 and its pointed end disengages the passage 19.

In the modified form of nozzle shown in Figure 2 the end of the grease gun shank 20 is integral with or is fixedly attached to an outer sleeve 21 the lower end of which is formed with an inwardly-turned flange 22, above which is fitted a ring 23 of soft resilient material such as rubber, synthetic rubber or felt. The hollow piston member comprises a crown 25 and a skirt 24, the lower end of which is formed with an inwardly turning flange 24a, slidable in the bore of the outer sleeve.

The hollow injector device is formed with a pointed end 26 and a hollow shank 27a slidable in a hole formed centrally in the crown of the piston member, the injector device also being provided with radial guide wings 27 which are slidably guided in the bore of the skirt of the piston member. A coil spring 28 which reacts between a shoulder 29 at the lower end of the skirt and the wings of the injector device thrusts the latter upwards away from the inwardly-turned flange 22 of the outer sleeve, the upward movement of the injector device being limited by a shoulder 30 formed in the skirt.

When the nozzle is in its working position upon the nipple the inwardly-turned flange 24a of the piston skirt, the resilient ring 23 and the inwardly-turned flange 22 of the outer sleeve fit over the nipple head and the outer sleeve bears upon the locating flange 31 of the nipple. The flange 24a acts as a guide to centralize the nozzle upon the nipple. When pressure is applied to the grease in the grease gun the piston member is forced downwards gripping the resilient ring 23 between the flange at its lower end and the inwardly-turned flange 22 of the outer sleeve thus causing it to be distorted radially inwards crushing the side of the nipple head 32 below the metal ring 33 in the nipple head inwards as shown in dotted lines. The grease pressure also forces the injector device downwards against the coil spring 28 so that its pointed end 26 enters the opened inlet end 32a of the lubricant passage in the nipple and a charge of grease is injected into the nipple and thence to a place of use. Under the action of the spring 28 the injector device and the piston member are thrust upwards when the grease pressure is released.

In another modified nozzle which is shown in Figure 3, the upper end 34 of an inner sleeve is screwed onto the end of the shank 35 of the grease gun nozzle. The lower end 36 of the inner sleeve is formed with an inwardly-turned flange 37 the purpose of which will be explained hereinafter. An outer sleeve 38 is slidably arranged upon the upper end of the inner sleeve, the slidable movement of the outer sleeve being limited by means of a pin or pins 39 which are screwed into the upper end of the inner sleeve and is or are engaged in an elongated slot or slots 40 formed in the outer sleeve. The lower end of the outer sleeve is formed with an inwardly sloping part 41 terminated by a cylindrical flange 42. A number of jaws 43 are loosely attached to the lower part 36 of the inner sleeve at their upper ends and are accommodated in the annular space between the lower part of the inner sleeve and the conical inner wall 44 of the outer sleeve. The jaws are suspended from the inner sleeve by means of pins 45. The outer sleeve is normally pressed downwards by means of a coil spring 46 which reacts between a shoulder 47 in the outer sleeve and a shoulder 48 formed by the upper part of the inner sleeve.

In this construction, the injector device 49 comprises a pointed end 50, a piston part 51 which is slidable in the said inner sleeve and a hollow guide shank 52 which is slidable in the shank of the grease gun nozzle and which is provided with a number of lateral ports 53. The injector device is normally thrust upwards by means of a coil spring 54 which reacts between a shoulder 55 in the lower part of the inner sleeve and the underside of the piston part 51 of the injector device. The upward movement of the injector device is limited by stops 56 provided on the lower end of the nozzle shank 35.

When the nozzle is in its working position upon the nipple, the lower ends 43 of the jaws, the inturned flange 37 of the inner sleeve and the flange part 42 of the outer sleeve 38 fit over the nipple head and the end part of the flange 42 bears upon the locating flange 57 of the nipple. The inwardly-turned flange 37 of the inner sleeve thus acts as a guide and embraces the nipple head, centralising the nozzle upon the nipple. When manual thrust is applied to the nozzle the inner sleeve 34—36 with the jaws 43 move downwards relatively to the outer sleeve 41, the conical surface 44 of which acts upon the jaws and forces them inwards. This inward movement of the jaws results in the side of the nipple head being distorted inwards below the reinforcing ring 58 therein, as shown in dotted lines, the normally closed inlet end 59 of the lubricant passage in the nipple head thus being opened by leverage effect as previously explained. When pressure is applied to the grease in the grease gun the injector device is forced downwards against the thrust of the spring 54 acting upon it by reason of the thrust exerted on the piston part 51 of the device by the grease which flows through the hollow guide shank 52 and the ports 53 in the injector device into the annular space between the upper surface of the piston part and the lower end of the nozzle shank 35. When the grease pressure is released the injector device is thrust upwards by its spring 54.

Another construction of nozzle which is shown in Figure 4 comprises a piston member 60 which is slidably arranged within the bore of an enlarged cylindrical part 61 provided at the lower end of the nozzle shank 62. The end of the enlarged part 61 is formed internally with a sloping part 63 which is terminated by a cylindrical flange 64. A number of jaws 65 are loosely attached to a reduced skirt part 66 of the piston member by means of pins 67. The piston member is normally thrust upwards by means of a coil spring 68 which is arranged within the enlarged part 61 of the nozzle shank on the underside of the piston member. The injector device is formed with a pointed end 69 and with radial guide wings 70 which are slidable within the bore of the piston member. The upper end 71 of the hollow injector device is slidably guided in a hole 72 formed in the crown of the piston member. A coil spring 73 reacts between a shoulder 74 in the piston skirt and the wings 70 and thus acts to thrust the injector device upwards within the piston member, its upward movement being limited by a sholuder 75 in the piston member.

When the nozzle is applied to the nipple the end 64 of the enlarged part 61 of the nozzle shank passes over the nipple head and bears upon the locating flange 76 of the nipple and the inturned flange of the piston skirt 66 acts as a guide. When pressure is applied to the grease in the grease gun the piston member 60 is forced downwards carrying with it the jaws 65. The latter contact with the inner conical surface 63 of the enlarged part 61 of the nozzle shank and are forced radially inwards and act to distort the side of the nipple head below the reinforcing ring 77 in the nipple as shown in dotted lines and thus to open the normally closed inlet end 78 of the lubricant passage in the nipple by leverage effect. The pressure of the grease also forces the injector device downwards until its pointed end 69 is engaged in the opened inlet end of the small size lubricant passage 78 in the nipple and a charge of grease is injected into the nipple and thence to the place of use.

When the grease pressure is released the injector device and the piston member are thrust upwards by their springs 73 and 68.

The nozzle shown in Figure 5 comprises a hollow body 79 integral with a conduit 80 which acts as a handle and is connected to a grease gun or other pressure source. The upper end of an inner sleeve 81 is screwed on to the lower end of the nozzle body and an outer sleeve 82 is slidably mounted upon the upper part of the inner sleeve. The outer sleeve is formed with a conical part 83, which is terminated by a cylindrical part 84, and with two longitudinally-spaced collars 85 between which the forked end 86 of a lever 87 is engaged. The lever is pivotally mounted upon a pin 88 fixed upon the conduit 80. The forked end of the lever and thus the outer sleeve are normally forced downwards by a blade spring 89 one end of which is fixed to the conduit while its opposite end thrusts the operating arm of the lever 87 upwards.

A number of jaws 90 having inturned ends 91 are loosely attached at their upper ends to the inner sleeve 81 in the annular space between the latter and the outer sleeve.

The injector device comprises a hollow cylindrical shank 92, which is slidable in the bore 93 of the nozzle body, and a piston part 94 which is slidably guided in the bore of the inner sleeve. The injector device is provided with a central lubricant passage 95 and with a number of radial ports 96 which provide communication between the passage and the outer surface of the hollow cylindrical shank 92. A coil spring 97 fitted in the inner sleeve acts to thrust the injector device upwards, its upward motion being limited by stops 98 provided on the lower end of the nozzle body. The injector device is also formed with a pointed end 99 as in the constructions described above.

When the nozzle is placed in its working position upon the nipple, the lower end of the inner sleeve 81 and the cylindrical part 84 of the outer sleeve fit around the nipple head and the cylindrical part 84 seats upon the locating flange 100 of the nipple. By pressing the operating arm of the lever 86 towards the conduit 80 the operator causes the outer sleeve 82 to slide upwards relatively to the inner sleeve, the conical part 83 of the outer sleeve reacting against the jaws 90 forces them inwards to distort the sides of the nipple head as shown in dotted lines and thus to open the inlet end 101 of the lubricant passage by leverage effect as described in reference to the sage by leverage effect as described in reference to the previous constructions.

When pressure is applied to the grease by the grease gun some of the grease is forced out of the passage 95 in the injector device through the ports 96 in the latter into the annular space between the lower end of the nozzle body and the top surface of the piston part 94, where, acting upon the latter, it thrusts the injector device downwards against the action of its spring 97. The pointed end 99 of the injector device is thus forced into the opened inlet end 101 of the lubricant passage in the nipple and grease is injected thereinto as described in reference to previous constructions.

I claim:

1. A lubricant dispensing nozzle for use with a resilient lubricant impervious closure member of the type having a hollow nozzle engaging head including a cylindrical part having an external cylindrical wall and an outer end surface, means in the outer end of the head forming a normally closed lubricant passage extending between the outer end surface and the interior of the head, and an annular fulcrum means engaging the interior of the head radially outwardly of the point at which the passage terminates; said nozzle comprising in combination an outer sleeve having an inwardly projecting flange at its outer end, a hollow inner member longitudinally slidable within said outer sleeve, said hollow inner member having an open end adapted to embrace the cylindrical part of the nozzle engaging head, a hollow lubricant injector longitudinally slidable in said hollow inner member and movable by lubricant under pressure in the nozzle toward lubricant dispensing position, and means for applying pressure laterally to the outer surface of the cylindrical wall of the nozzle engaging head, said last named means comprising means normally biased out of wall engaging position and adapted to be engaged by said flange and moved between said flange and the end of said hollow inner member circumferentially to contact and constrict the cylindrical wall of the nozzle engaging head on that side of the fulcrum means opposite the outer end of the head upon movement of said hollow inner member toward said flange, thereby to open the outer end of the passage ot allow entry of said injector thereinto as it is moved toward lubricant dispensing position under lubricant pressure in the nozzle.

2. A lubricant dispensing nozzle as claimed in claim 1, including a spring normally biasing said injector toward inoperative position.

3. A lubricant dispensing nozzle for use with a resilient lubricant impervious closure member of the type having a hollow nozzle engaging head including a cylindrical part having an external cylindrical wall and an outer end surface, means in the outer end of the head forming a normally closed lubricant passage extending between the outer end surface and the interior of the head, and an annular fulcrum means engaging the interior of the head radially outwardly of the point at which the passage terminates; said nozzle comprising in combination an outer sleeve having an inwardly projecting flange at its outer end, a hollow inner member longitudinally slidable within said outer sleeve, said hollow inner member having a flange facing said outer sleeve flange and adapted to surround the cylindrical part of the nozzle engaging head, a hollow lubricant injector longitudinally slidable in said hollow inner member and movable by lubricant under pressure in the nozzle toward lubricant dispensing position, and means for applying pressure laterally to the outer surface of the cylindrical wall of the nozzle engaging head, said last named means comprising a ring of resilient material which when the nozzle is in lubricant dispensing position circumferentially embraces the cylindrical wall of the nozzle engaging head on that side of the fulcrum means opposite the outer end of the head, said ring being confined between said flanges and being compressed therebetween by relative longitudinal movement of said hollow inner member and said outer sleeve in one direction so as to be displaced inwardly thereof circumferentially to constrict the cylindrical wall of the head, thereby to open the outer end of the passage to allow entry of said injector as it is moved toward lubricant dispensing position under lubricant pressure in the nozzle.

4. A lubricant dispensing nozzle as claimed in claim 3, including a spring acting between said hollow inner member and said injector to bias said injector toward inoperative position.

5. A lubricant dispensing nozzle for use with a resilient lubricant impervious closure member of the type having a hollow nozzle engaging head including a cylindrical part having an external cylindrical wall and an outer end surface, means in the outer end of the head forming a normally closed lubricant passage extending between the outer end surface and the interior of the head, and an annular fulcrum means engaging the interior of the head radially outwardly of the point at which the passage terminates; said nozzle comprising in combination an outer sleeve having an inwardly projecting flange at its outer end, an inner sleeve longitudinally slidable within said outer sleeve, said inner sleeve having an open outer end adapted to embrace the cylindrical part of the nozzle engaging head, one of said sleeves being manually slidable relative to the other, a hollow lubricant injector longitudinally slidable in said inner sleeve and movable by lubricant under pressure in the nozzle toward lubricant dispensing position, and means for applying pressure laterally to the outer surface of the cylindrical wall of the nozzle engaging head, said last named means comprising a ring of resilient material which when the nozzle is in lubricant dispensing position circumferentially embraces the cylindrical wall of the nozzle engaging head on that side of the fulcrum means opposite the outer end of the head, said ring being confined between said flange and the outer end of said inner sleeve and being compressed therebetween by manual longitudinal movement of said inner sleeve in said outer sleeve in one direction so as to be displaced inwardly of said sleeve circumferentially to constrict the cylindrical wall of the head, thereby to open the outer end of the passage to allow entry of said injector as it is moved toward lubricant dispensing position under lubricant pressure in the nozzle.

References Cited in the file of this patent

UNITED STATES PATENTS

| | | |
|---|---|---|
| 907,875 | Pritchard | Dec. 29, 1908 |
| 1,241,352 | Doering, Jr. et al. | Sept. 25, 1917 |
| 1,611,239 | Sanford | Dec. 21, 1926 |
| 2,047,132 | Williams | July 7, 1936 |
| 2,234,238 | Forsberg | Mar. 11, 1941 |
| 2,328,327 | Cobb | Aug. 31, 1943 |
| 2,328,863 | Threm | Sept. 9, 1943 |
| 2,397,342 | Farrell | Mar. 26, 1946 |
| 2,400,817 | Fox | May 21, 1946 |

FOREIGN PATENTS

| | | |
|---|---|---|
| 430,827 | Great Britain | June 26, 1935 |